United States Patent [19]

Walles

[11] Patent Number: 4,613,524

[45] Date of Patent: Sep. 23, 1986

[54] OPEN-CELL COMPOSITION AND METHOD OF MAKING SAME

[75] Inventor: Wilhelm E. Walles, Freeland, Mich.

[73] Assignee: The Dow Chemical Company, Midland, Mich.

[21] Appl. No.: 822,719

[22] Filed: Jan. 27, 1986

[51] Int. Cl.$^4$ .............................................. A21D 6/00
[52] U.S. Cl. ..................................... 427/243; 428/290; 521/54; 521/57; 523/218; 523/219; 524/430
[58] Field of Search ............... 427/243; 521/54, 57; 428/290; 523/218, 219

[56] References Cited

U.S. PATENT DOCUMENTS

| | | | |
|---|---|---|---|
| 2,874,140 | 2/1959 | Kloepfer et al. | 524/430 |
| 3,062,682 | 11/1962 | Morgan et al. | 427/243 |
| 3,511,787 | 5/1970 | Berlorelli et al. | 521/73 |
| 3,945,955 | 3/1976 | Ihde, Jr. | 521/73 |
| 3,985,929 | 10/1976 | Von Bonin et al. | 427/243 |
| 4,446,253 | 5/1984 | Hahn et al. | 521/91 |
| 4,473,683 | 9/1984 | Coran | 427/243 |
| 4,503,117 | 3/1985 | Murray | 427/243 |

*Primary Examiner*—Morton Foelak
*Attorney, Agent, or Firm*—John E. McGarry

[57] ABSTRACT

Open-cell foamed particles and molded shapes having up to 99% porosity are formed from fumed oxides, for example $SiO_2$, $Al_2O_3$, $TiO_2$, with or without functional groups, in 30–99%, by weight, and polymers, for example polyvinyl chloride and copolymers thereof, and styrene. The resulting structures are thermally insulating. The structures can be formed by beating small amounts of a liquid polymerizable monomer into the fumed oxide or by immersing a formed shape of the oxide in a liquid monomer and thereafter polymerizing the monomer to a solid polymer. The oxide is believed to have a microfibrous nature and the polymer is believed to coat the oxide, without destroying the open-nature configuration of the oxide, and cements the oxide particles together in the microfibrous condition.

17 Claims, No Drawings

OPEN-CELL COMPOSITION AND METHOD OF MAKING SAME

FIELD OF THE INVENTION

This invention relates to open-cell, low-density compositions used principally for insulating materials. In one of its aspects, the invention relates to solid open cell shapes formed of a structural inorganic network reinforced by solid polymers. In another of its aspects, the invention relates to a method for producing open-cell structural inorganic compositions having reinforcing polymers.

STATE OF THE PRIOR ART

Open-cell compounds, such as foamed polystyrene, are well known and have good insulating properties. Polystyrene, like other thermoplastics, tends to deform or melt when heated to high temperatures.

It is known to thicken liquid styrene with small amounts of fumed silica to achieve higher viscosity prior to polymerization. It is also known to add silica as a filler to molten polymers or to the monomers prior to polymerization. With relatively small amounts of silica however, the silica "balls up" into regions containing thousands to millions of spheres, rather than distributing evenly. In any case, the character of the polystyrene is retained and the polymer exhibits some degree of thermal instability.

An example of a filled polystyrene foam is disclosed in the Hahn et al U.S. Pat. No. 4,446,253, issued May 1, 1984. Hahn et al disclose the manufacture of fine-celled foams in which a styrene polymer is melted and mixed with a volatile blowing agent and a nucleating agent under superatmospheric pressure. The pressure is reduced and the foam is cooled. The nucleating agent includes one to 100 milimicron silica which is present in 0.1 to 1% by weight in the mixture.

Another example of a filled foam is disclosed in the (Bertorelli et al ), U.S. Pat. No. 3,511,787, issued May 12, 1970. Bertorelli et al disclose one incorporation of highly reactive silica into a plastisol with a blowing agent in an otherwise conventional process for producing a vinyl polymer foam. The highly reactive silica is used in an amount up to 8 parts per 100 parts of polymer by weight.

The Kloepfer U.S. Pat. No. 2,874,140, issued Feb. 17, 1959, discloses a polyethylene or polyvinyl chloride composition with up to 20% of a fumed silica or similar metal oxide. The oxide can be mixed with the resin before or after polymerization.

SUMMARY OF THE INVENTION

According to the invention, there is provided a foamed composition characterized by open cell pores and low densities formed principally of a microfibrous inert inorganic compound having an open cell network. The inorganic compound is structurally reinforced with a polymer, without appreciably interfering with the open-cell characteristic of the structure.

The compositions according to the invention have low bulk densities, typically about 0.1 grams per cubic centimeter (6.2 pounds per cubic foot) or less. The compositions are highly porous. The percentage of pores in the composition can range from 30 to 99%, depending on the relative amounts of inorganic compounds and polymer and the degree of compression of the inorganic compounds.

The compositions according to the invention can be made in particulate form and used as thermal insulating materials or can be molded into solid shapes to form lightweight thermal insulating shapes, such as cups, panels and the like. The compositions according to the invention are resistant to cracking and have increased bulk strength. The compositions also have improved heat distortion characteristics and minimize any drip during burning.

The inorganic compound according to the invention is preferably selected from the group consisting of insoluble ceramic and metal oxides which are microfibrous in nature, but can also include graphite fibers, boron nitride fibers, aramide fibers and the like. Examples of these compounds include the fumed oxides of silicon, aluminum, titanium, vanadium, magnesium, manganese, zinc, beryllium, iron, nickel, cobalt, copper, gallium, and germanium. Other regular and heavier insoluble metal oxides can also be used. The preferable compounds are the fumed oxides of silicon, aluminum and titanium.

The inorganic compounds are further characterized by a small particle size, typically around 100 angstroms. However, the particle size can range from 60–200 angstroms.

The inorganic compounds are microfibrous in nature, that is, the particles themselves form long chains of cohesively attracted particles. These chains form a mat or batting of randomly oriented fibers, leaving open voids therebetween. Examples of such microfibrous compounds are fumed silica, conventionally made by high-temperature flame hydrolysis of $SiCl_4$ and $SiF_4$. These compounds have been found to exhibit compressibility characteristics similar to those of glass fibers.

The inorganic compounds typically have very high surface areas per unit of weight. The surface area per weight unit can vary over a relatively wide range depending upon the oxide or other compound selected. However, surface areas typically will range from 100–2000 square meters per gram, with surface areas of 100 to 300 being preferred. Surface areas can be measured by the Brunauer, Emmett and Teller nitrogen absorption method.

The inorganic compounds can be hydrophylic or hydrophobic. Hydrophylic compounds result from the flame hydrolysis of halogenated silicon. Hydrophobic compounds are formed by adding siloxane groups to the silica. A suitable hydrophobic fumed silica is sold by Tulco, Inc., of Billerica, N.J. under the mark TULLANOX.

Vinylized silica can also be used in the invention. Vinylized silica is made by chemically bonding vinyl groups to fumed silica. Other functionally reactive groups which can be added to the silica or other inorganic compounds include sulfur, metals and styrene.

The organic polymer which is used in the invention is any polymer formed by polymerizing an ethylenically unsaturated monomer which preferably is in liquid form and is relatively volatile, having a vapor pressure at room temperature of at least 15 mm of mercury.

Organic polymers which may be employed in the compositions of this invention are polymers which are obtained from the polymerization of at least one organic compound having at least one aliphatic carbon-carbon double bond. Suitable organic compounds having at least one aliphatic carbon-carbon double bond, are for example hydrocarbons such as ethylene, which may be polymerized by low-pressure, moderate-pressure or high-pressure polymerization, propylene, isobutylene, methylbutene-1, butene-1, methylpentene-1, isoprene, butadiene, styrene, hexadiene, dicyclopentadiene or ethylidenenorbornene and chlorinated hydrocarbons such as vinyl chloride, vinylidene chloride and chloroprene. Other examples of organic compounds which may be employed are alpha, beta-unsaturated acids or their derivatives, such as acrylic acid, methacrylic acid, acrylamide, methacrylamide, acrylonitrile, methacrylonitrile, methyl acrylate, methyl methacrylate or ethyl methacrylate; and carboxylic acids esters of unsaturated alcohols, such as vinyl acetate or vinyl laurate.

Additional examples of polymers which are produced by the polymerization of more than one organic compound with at least one aliphatic carbon-carbon double bond are those from ethylene and propylene, terpolymers from ethylene, propylene and a diene (EPDM), such as butadiene, hexadiene, dicyclopentadiene or ethylidenenorbornene, from ethylene and butene-1, from isobutylene and isoprene, from ethylene and vinyl acetate, from butadiene and acrylonitrile, from styrene and butadiene, from styrene and acrylonitrile, from styrene and methacrylate, from acrylonitrile, styrene and butadiene, from ethylene and methyl acrylate, and from vinyl chloride and vinyl acetate.

Other polymers which may be employed are those polymers obtained by further reacting a polymer produced by the polymerization of at least one organic compound with at least one aliphatic carbon-carbon double bond. Examples of such polymers are polyvinyl alcohols, saponification products of copolymers of ethylene and vinyl acetate, polyvinyl acetals such as polyvinyl butyrals, and chlorosulfonated polyethylenes.

Examples of other organic polymers are polyamides, polyimides, polycarbonates, polyurethanes, polyacetals, other polyethers such as polyphenylene ether and polyglycols, for example, poly(propylene oxide) allyl glycidyl ether, polysulfones, polyesters such as polyterephthalic acid esters, polyepichlorohydrins and polycarbodiimides.

The preferred polymers are polyvinyl chloride, copolymers thereof and polystyrene.

The relative proportion of the inorganic compound to the polymer can vary over a wide range so long as the structural integrity of the inorganic compound is preserved. Typically, 99-30% by weight of the inert organic compound is present with 1-70% by weight of the polymer. A preferred composition is 50% by weight inorganic compound and 50% by weight polymer.

The composition according to the invention can be made in several ways. A method for making the product comprises the steps of thoroughly dispensing from 1-70% by weight of a polymerizable monomer into 30-99% by weight of a highly porous microfibrous, inert inorganic compound and thereafter polymerizing the monomer to a solid polymer. The polymerization process can take place with or without a catalyst, depending on the type of monomer and the temperature under which the reaction takes place.

Small amounts of the monomer can be admixed with the inorganic compound and the mixture can be beaten in the presence of a gaseous foaming agent, such as air, under conditions to foam the mixture prior to polymerization. Alternatively, the inorganic compound can be compressed into a solid shape and the monomer can be added to the solid shape and thereafter polymerized. To this end, the inorganic compound can be compressed in an evacuated chamber and the liquid monomer can thereafter be added to the evacuated chamber.

A catalyst and/or heat and/or pressure can be used in the polymerization step according to the nature of the organic monomer. Conventional catalysts can be employed in the process.

The polymerization takes place for a time and at temperatures sufficient to polymerize the monomer to a solid polymer. The time and temperature will vary depending on the monomer and catalyst. However, polymerization is carried out according to conventional procedures.

The following examples illustrate the invention:

I

Twenty grams of a liquid styrene was added to 20 grams of fumed silica (fluffy) in a Waring blender. The mixture was stirred vigorously for three minutes resulting in a 50/50 weight mixture but with over 90% air by volume. The fumed silica was a regular fumed silica, Cab-O-Sil M5. Six hundred parts per million of a dibenzoyl peroxide was added as a catalyst to aid in polymerization of the styrene. The mixture was cast into a sheet and the styrene was polymerized. After polymerization of the styrene, the product was examined. The product was characterized by a solid mass having a bulk density of 0.10 grams per cubic centimeter or 6.2 pounds per cubic foot. This sample was found to have 92.2% voids and 7.8% solids. A small amount of styrene vapor appeared to be trapped in the open-cell pores in the product.

II

The same procedure as used in example 1 was carried out except that the level of dibenzoyl peroxide was increased to 1200 parts per million. The results of this example were substantially the same.

III

The same process as carried out in example 1 was conducted using a hydrophobic fumed silica, Tullanox 500 in lieu of the Cab-O-Sil M5. This process resulted in a product similar to the product produced by example 1.

IV

The same process as carried out in example 2 was conducted except that a hydrophobic fumed silica, Tullanox 500, was used in lieu of the Cab-O-Sil M5. The results were essentially the same as example 2.

V

The same process as set forth in example 1 was carried out except that vinylized silica based on Cab-O-Sil M5 was used in lieu of the regular fumed silica. The vinylized silica is produced by treating Cab-O-Sil M5 with a vinyl monomer to add a polymerizable vinyl group to the silica. The results of the test were essentially the same.

VI

The same process as carried out in example 2 was carried out except that vinylized silica was used in place of the fumed silica. The results of these tests were essentially the same as those of example 2.

The invention provides an economical low-density foam material which can be used for insulation and which has thermal stability properties in excess of those of conventional foamed polymers. Those compositions containing iron oxide have the additional utility of use in electromagnetic shielding applications. These compositions may absorb microwave energy and may have further use in radar application and similar electromagnetic radiation applications.

It is believed that the polymers formed in the invention structurally reinforce the cohesively bonded particles to strengthen and reinforce the fibrous mass. The resulting structure thus has more of a fiber-like characteristic than the inorganic compounds by themselves.

The novel compositions of the invention can be made without the need for conventional blowing agents. The inorganic fibrous component forms the basic framework for the open cell structure while the polymer forms around the inorganic compound to give structure and a sort of glue to the structure. Thus the inorganic compound provides the open cell framework and the polymer provides the strength to the framework.

Reasonable variation and modification are possible within the scope of the foregoing disclosure and drawings without departing from the spirit of the invention.

The embodiments of the invention in which an exclusive property or privilege is claimed are defined as follows:

1. A process for producing a thermally insulated open-cell compound comprising the steps of:
   thoroughly dispersing 1–70 parts by weight of at least one monomer having at least one aliphatic carbon-carbon double bond in 99–30 parts by weight of a highly porous microfibrous inert inorganic compound said inorganic compound being formed from particle having a particle size in the range of 60–200 angstrom units and the particles are joined to form fibers; and
   polymerizing the monomer with the inorganic compound to a solid mass to coat the inorganic compound while preserving the open-cell porous nature thereof.

2. A process according to claim 1 wherein the monomer is a liquid and is added to the inorganic compound in small amounts, and the inorganic compound is in powder form; and further comprising the step of beating the mixture of the liquid monomer and the inorganic compound rapidly to disperse the monomer in the polymer to form a stable foam liquid prior to the polymerization step.

3. A process according to claim 2 wherein the liquid monomer has a vapor pressure of at least 15 mm of mercury at room temperature.

4. A process according to claim 3 wherein the monomer is selected from the group consisting of vinyl chloride and styrene.

5. A process according to claim 4 wherein the inorganic compound is a fumed oxide selected from the group consisting of silicon, aluminum, titanium, magnesium, zinc, barium, iron, nickel and copper.

6. A process according to claim 5 wherein the inorganic compound is formed of particles which predominantly have a size of about 100 angstroms and the particles are cohesively joined together to form fibers.

7. A process according to claim 1 wherein the monomer is selected from the group consisting of vinyl chloride and styrene.

8. A process according to claim 1 wherein the inert inorganic compound is a fumed oxide selected from the group consisting of silicon, aluminum and titanium.

9. A process according to claim 1 wherein the inorganic compound is formed of particles which have a predominant size of about 100 angstrom units and the particles are cohesively joined together to form fibers.

10. A process according to claim 1 wherein the inorganic compound is first compressed into an integral shape and the dispersing step comprises treating the compound shape with the liquid monomer prior to the polymerization step, whereby the resulting product of the process is a formed shape.

11. A process according to claim 10 wherein the liquid monomer has a vapor pressure of at least 15 mm of mercury at room temperature.

12. A process according to claim 11 wherein the monomer is selected from the group consisting of vinyl chloride and styrene.

13. A process according to claim 12 wherein the inorganic compound is a fumed oxide which selected from the group consisting of silicon, aluminum and titanium.

14. A process according to claim 13 wherein the inert inorganic compound is formed of particles which predominantly have a size of about 100 angstrom units, and the particles are cohesively joined together to form fibers.

15. A process according to claim 10 wherein the monomer is selected from the group consisting of vinyl chloride and styrene.

16. A process according to claim 10 wherein the inorganic compound is formed from fumed oxides which are selected from the group consisting of silicon, aluminum and titanium.

17. A process according to claim 10 wherein the inorganic compound is formed of particles which have a predominant size of about 100 angstrom units and the particles are cohesively joined together to form fibers.

* * * * *